United States Patent [19]

Hammel

[11] 4,321,523

[45] Mar. 23, 1982

[54] BATTERY CHARGER AND POWER SUPPLY CIRCUITRY

[75] Inventor: Ronald O. Hammel, Englewood, Colo.

[73] Assignee: The Gates Rubber Company, Denver, Colo.

[21] Appl. No.: 948,739

[22] Filed: Oct. 5, 1978

[51] Int. Cl.³ .............................................. H02J 7/10
[52] U.S. Cl. ..................................... 320/14; 320/21; 320/39; 320/59
[58] Field of Search .................... 320/57, 59, DIG. 2, 320/39, 40, 29, 14, 21; 307/66

[56] References Cited

U.S. PATENT DOCUMENTS

| | | | |
|---|---|---|---|
| 3,586,955 | 6/1971 | Kisiel | 320/39 |
| 3,708,738 | 1/1973 | Crawford et al. | 320/40 X |
| 3,842,288 | 10/1974 | Bradshaw | 320/39 X |
| 3,867,682 | 2/1975 | Yamauchi et al. | 320/39 |
| 3,876,921 | 4/1975 | Bigbee | 320/39 X |
| 3,970,912 | 7/1976 | Hoffman | 320/39 X |
| 3,987,354 | 10/1976 | Mason | 320/39 |
| 4,039,920 | 8/1977 | Popp | 320/39 X |

Primary Examiner—Robert J. Hickey
Attorney, Agent, or Firm—Curtis H. Castleman, Jr.; Raymond Fink; H. W. Oberg, Jr.

[57] ABSTRACT

A transformerless battery charging circuit is described including a rectifier, a semiconductor switch in series with the battery, a sensing network monitoring battery voltage, a trigger circuit responsive to the sensed battery voltage for controlling operation of the semiconductor switch, and a voltage regulator for regulating output voltage of the rectifier as supplied to the triggering and battery voltage sensing networks. The circuitry in combination with an appropriate rechargeable battery also serves as a power supply to drive a DC load connected to the battery.

6 Claims, 3 Drawing Figures

BATTERY CHARGER AND POWER SUPPLY CIRCUITRY

BACKGROUND OF THE INVENTION

This invention relates to circuits for fast charging rechargeable batteries, and to DC power supplies utilizing a rechargeable battery.

A network which is capable of fast charging a battery normally employs a rather large, expensive heavy transformer for stepping down the AC line voltage. The sheer size and weight and/or cost of the transformer restricts the number of applications in which fast charging methods are attractive for use in portable battery-powered devices.

In the power tool and lawn tool fields, for instance, the advantage of portability which cordless tools offer is recognized. On the other hand, AC power tools offer essentially continuous operation with uniform power output. The need exists to combine the advantages of each of these systems; the present invention meets this objective with a circuit network which can be used solely as a transformerless battery charging circuit, or which will charge a battery and keep its voltage at the proper level while simultaneously supplying DC power to a load, such as a DC motor.

SUMMARY OF THE INVENTION

In one aspect, the invention pertains to a transformerless AC to DC battery charger circuit including a rectifier circuit for converting the AC line to half or full wave direct current; a semiconductor switch coupled between the rectifier and the output terminals of the charger circuit; a trigger circuit coupled to a control terminal of the semiconductor switch and operable to generate a trigger pulse near the end of the half wave cycle of the rectified line current for enabling conduction of the semiconductor switch for the remainder of the half wave cycle; a battery sensing network coupled between the output terminals and trigger circuit adapted to monitor battery voltage, compare it to a predetermined reference voltage, and to generate a signal responsive to the difference between the battery and reference voltages for controlling operation of the trigger circuit; and voltage regulator circuitry for regulating the output voltage from the rectifier and for supplying regulated voltage to the trigger and battery sense circuits.

In another aspect, the invention is drawn to a DC power supply including a rechargeable battery and the AC to DC battery charger circuit described immediately above.

BRIEF DESCRIPTION OF THE DRAWINGS

Certain preferred forms of the invention will be described with reference to the accompanying drawings, wherein like numerals designate like parts, and in which.

PREFERRED EMBODIMENTS OF THE INVENTION

Figure 1:
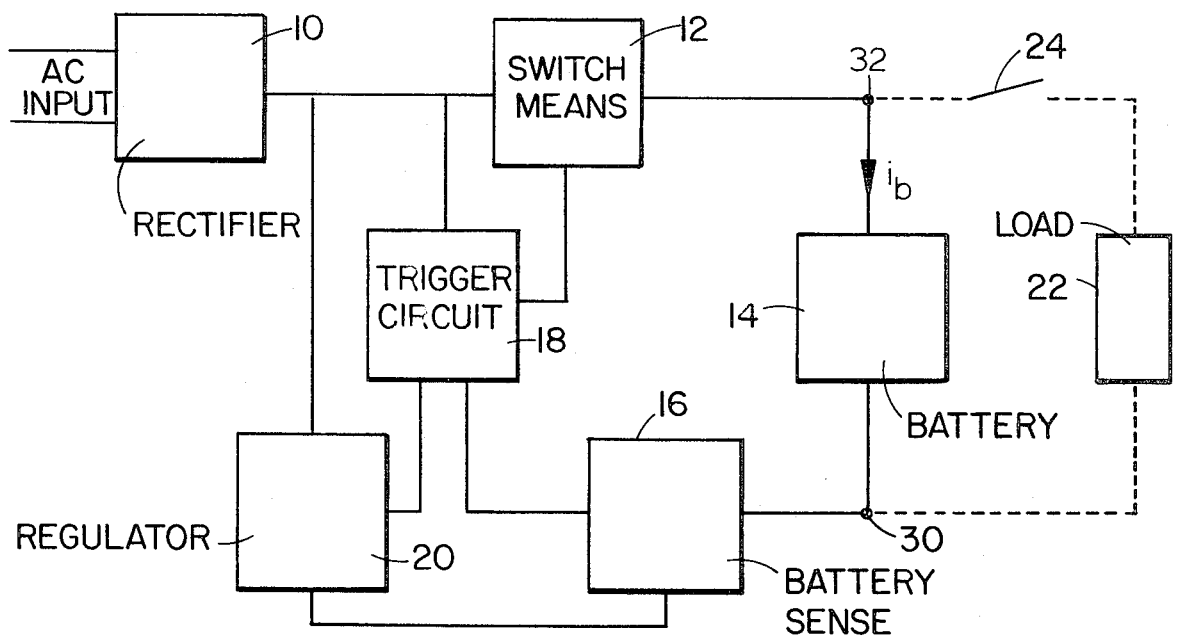
FIG. 1 is a block diagram of the network of the invention.

Referring first to FIG. 1, the battery charging circuit comprises rectifier 10, switch means 12, battery sensing circuit 16, trigger circuit 18, and regulator 20 connected as shown.

The rectifier circuit converts the AC line input to direct current of periodic wave form. The switch means is connected between the rectifier and battery 14, and admits current pulses to the battery as governed by the trigger circuit operating through the control terminal of the switch means. The operation of the trigger circuit, in turn, is controlled by the battery sensing circuit which monitors the battery voltage and generates trigger pulses to the switch means in accordance with the state of charge of the battery. The trigger point is set intermediate the beginning and end of the periodic wave form of the rectified AC wave form. The voltage regulator regulates the voltage applied to the trigger circuit and preferably the battery sensing circuit as well.

A load 22 may be connected across battery 14, controlled by on-off switch 24. In this case, the battery will simulate the operation of a capacitor by discharging through the load during the interval between charging pulses emanating from the switch means.

Figure 3:
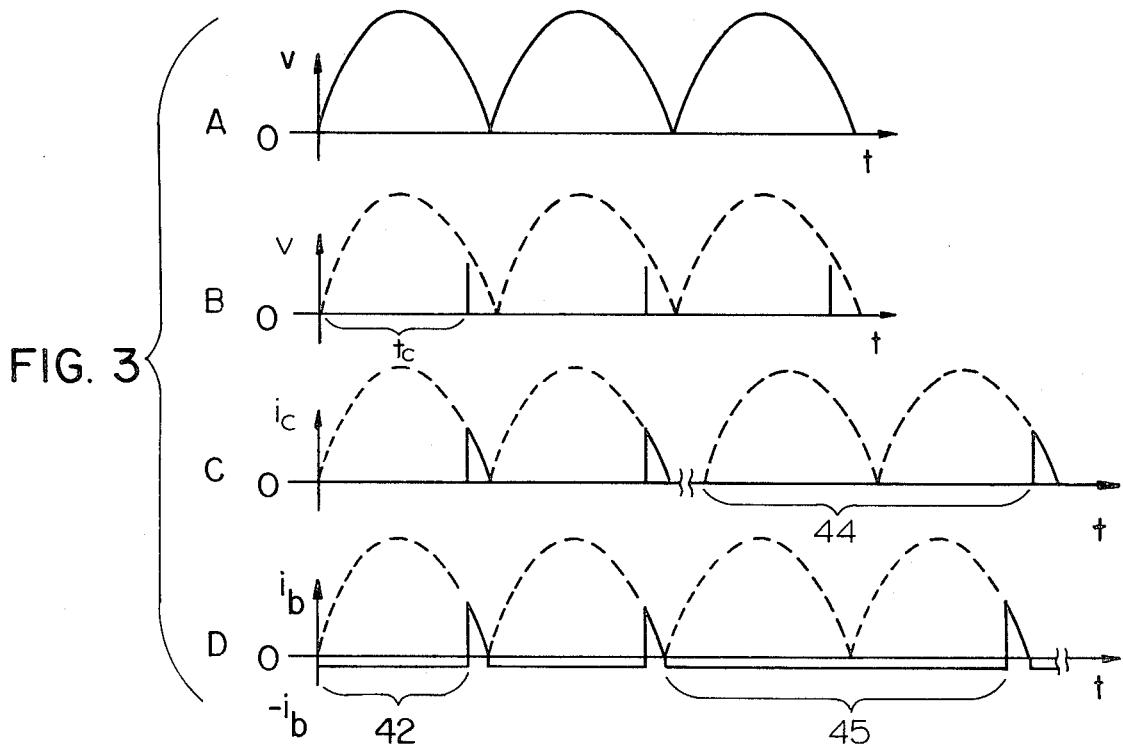
FIG. 3 illustrates different wave forms characterizing the circuitry of the invention.
Figure 2:
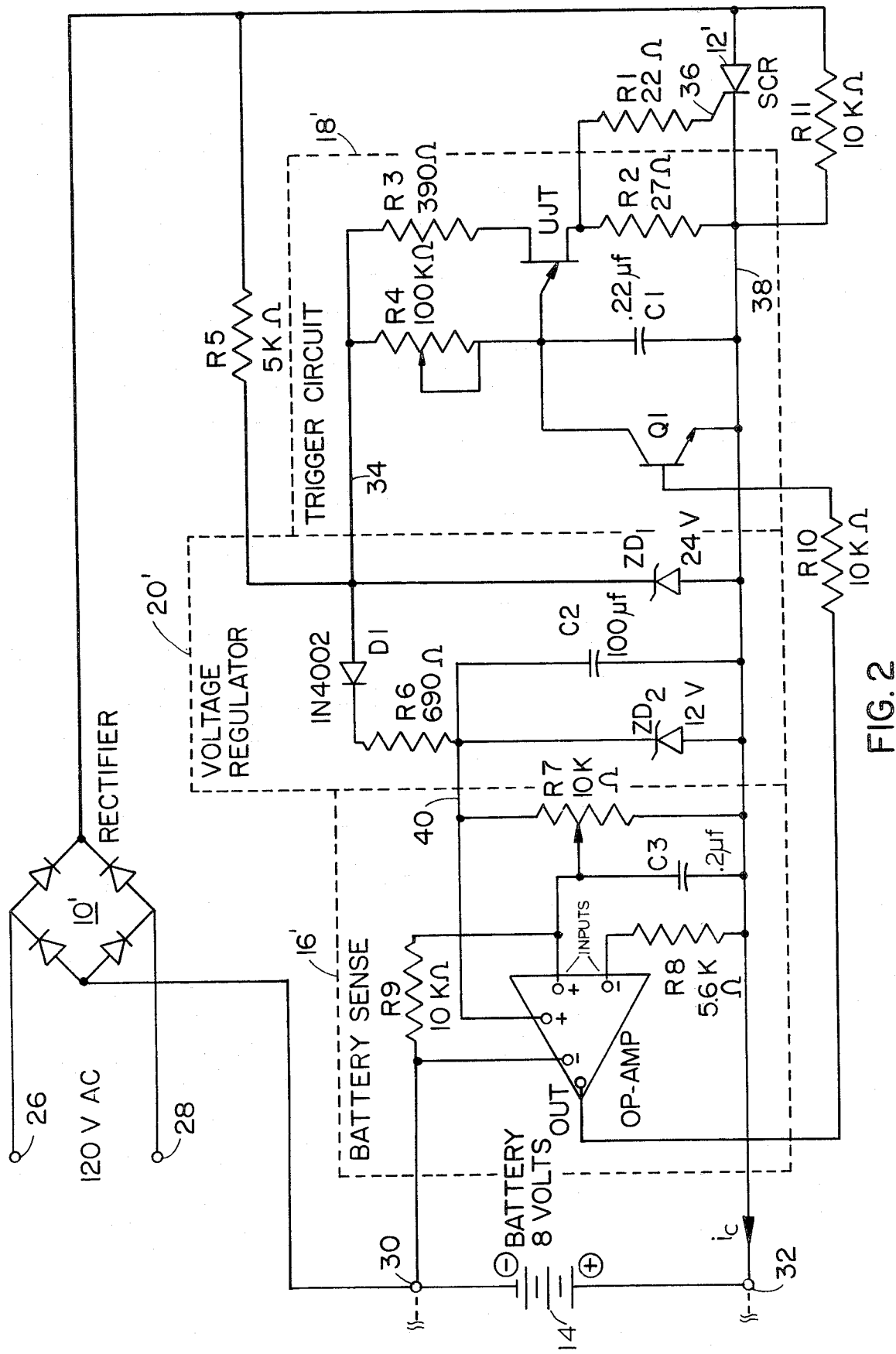
FIG. 2 depicts detailed circuitry of the transformerless battery charger of the invention.

Referring in detail to the embodiment of FIG. 2 in conjunction with the associated wave forms of FIG. 3, rectifier 10' converts the 60 Hertz AC input from lines 26–28 into full wave rectified direct current of 120 volt amplitude, shown in FIG. 3A. With proper sizing of circuit components any line voltage and frequency can be accommodated, such as 240 volt 50 Hertz. Voltages less than normal line voltage can also be accommodated by the circit, however, a principal advantage of the circuit is the ability to use full line voltages such as 120 volts without using a step-down transformer. While full wave bridge rectification is shown, half wave or other DC rectification may be employed.

Resistor R5 limits the current to voltage regulator circuit 20' and drops the voltage from 120 volts peak DC to an acceptable value for the 24 volt Zener diode $ZD_1$. Diode $D_1$ supplies a current path through resistor R6 to the 12 volt Zener diode $ZD_2$. Resistor R6 drops the voltage from 24 volts down to 12 volts. Capacitor C2 connected across the 12 volt Zener filters the signal across the 12 volt Zener to produce a desirable smooth DC voltage. Diode D1 allows for continued smooth DC voltage across the 12 volt Zener when the rectified DC wave form periodically goes to zero volts.

Regulated voltage of a reduced amplitude is thus supplied to trigger circuit 18 from voltage regulator 20' via conductor 34. Although various trigger circuit configurations which could be adapted to provide a control pulse at the gate control terminal 36 of SCR 12' could be used, the preferred network employs the relaxation oscillator 18' of FIG. 2. This relaxation oscillator circuit is basically a timing circuit which, assuming the battery to be less than fully charged, generates a trigger pulse once each half cycle as shown in FIG. 3B and is then reset each half cycle when the wave form crosses zero. The time constant of the oscillator is determined by the values of resistor R4 and capacitor C1. In the preferred embodiment shown the desired time constant $t_c$ is something slightly less than one-half of a 60 Hertz cycle or approximately 8 milliseconds.

The trigger pulses are generated as a result of the capacitor C1 charging through resistor R4 until the peak point voltage of the UJT (unijunction transistor) is reached at which time capacitor C1 discharges through the UJT and resistor R2 to the common buss 38 creating a positive voltage pulse at the junction of the UJT and R2. This pulse is applied to the gate of the SCR, thereby placing the SCR in a conductive mode for the remainder of the half wave cycle and supplying charge current pulses to the battery as shown in FIG. 3C.

The operation of this triggering circuit is well known. The UJT operates in a manner such that the emitter will conduct current only after the emitter to common buss voltage (across capacitor C1) is at a predetermined percentage (i.e, the peak point) of the total interbase voltage. At the beginning of each half cycle capacitor C1 is in a discharged state and the UJT in cutoff, and as the capacitor is charged through R4 its voltage increases until it meets the peak point voltage or emitter breakdown of the UJT. When this emitter breakdown voltage is reached, the discharge of capacitor C1 is almost instantaneous and uniform from cycle to cycle. The timing circuit is reset at the zero point of each half wave cycle, when the full wave rectified DC wave form reaches zero.

The triggering circuit may be sized to fire the SCR at any desired intermediate point in the half wave cycle. However, because the battery in most applications has a voltage substantially less than the line voltage input, it is highly preferred that the controlled rectifier fires near the end of each half wave cycle, therefore only delivering a very narrow high current pulse to the battery. As an example in the circuit of FIG. 2 using an 8-volt battery, the current pulse received by the battery through the SCR switch will be about 1 millisecond wide at its base by 60 amps high, with the battery seeing an overall time-averaged current of approximately 6 amperes. A current limiting device such as a resistor or inductor may alternatively be connected in the incoming line serving to limit the peak current. In this latter embodiment, the time constant will be reduced to fire the SCR earlier in the half wave cycle, thereby ensuring the desired time-averaged current at a lower peak current. As an additional option, bypass resistor R11 may be connected across the SCR and sized to supply a continuous trickle maintenance charge to the battery. This bypass resistor prevents admission of intermittent high current pulses to the battery when fully charged.

The switching means 12' is preferably a semiconductor switch, typically a silicon controlled rectifier (thyristor). This semiconductor switch means should pass alternately between states of substantially full conduction to states of substantial nonconduction, as is typical of the operation of SCR's.

As previously discussed, regulated voltage is provided through line 40 to the battery sensing circuit 16'. The sensing circuit is comprised primarily of the operational amplifier, which is connected to monitor the average voltage of the battery. The measured average battery voltage is compared to a preset voltage from adjustable resistor R7. The SCR will continue to deliver charge pulses until the average voltage of the battery exceeds the preset reference voltage. At that time the output of the operational amplifier goes high which turns NPN transistor Q1 on, thereby shorting capacitor C1 so that the voltage at the emitter of the UJT is held below the peak point voltage, and the SCR remains off. Biasing resistor R10 is sized to limit the current to the base of Q1 as needed. The operational amplifier in this particular circuit is supplied a reference voltage by the adjustable resistor R7 connected across the regulated 12 volt supply. This potentiometer sets a reference voltage at the positive input of the amplifier. A negative voltage is fed back from the negative terminal of the battery to that same positive input terminal of the operational amplifier. The negative input terminal of the operational amplifier is tied to the positive line or common 38 of the circuit through biasing resistor R8. As the battery increases in voltage the positive input at the summing point approaches zero since the battery voltage negates the voltage being supplied from the reference.

Resistor R9 provides the biasing serving to limit the feedback current into the amplifier.

As the voltage of the battery decreases, the output of the operational amplifier goes low turning Q1 off and again enabling capacitor C1 to be charged, and to generate trigger pulses to turn SCR on periodically once again. As shown in FIG. 3C, pulses will be generated initially each half wave cycle, and eventually as the battery approaches full charge, the pulses may be generated less frequently.

In an alternative mode of operation, the circuit together with the battery may be used as a power supply in which a load 22, such as a DC motor, is tied across the battery terminals 30, 32, controlled by on-off switch 24. The voltage sensing network 16' in the circuit is set at the same point as though the circuit were being used only as a battery charger, so that as the battery approaches a full state of charge SCR 12' will go into nonconduction as illustrated at 44 of FIG. 3C (except for the negligible current supplied through the bypass resistor R11). If the impedance of the load 22 across the battery is sufficiently low thereby drawing significant current from the battery, the battery and load combination may never approach full state of charge, and, therefore, the circuit will continue to supply high current pulses. As shown (out of scale) in FIG. 3D, the current $i_b$ (flowing in a positive sense into the battery, and a negative sense $-i_b$ out of the battery), will be described by a wave form similar to that of FIG. 3C, but with intervening discharges 42 during the first portion of each half cycle of the full wave rectified wave form. The negative amplitude of this discharge may be approximately 1/10 that of the peak amplitude of the charging pulses in the hereinafter described illustrative grass trimmer application employing an 8-volt motor.

The components of the circuit should be sized such that the amount of current supplied by each of the intermittent pulses (area under the pulse curve) exceeds slightly e.g., by about 10 percent, the current discharge back through the load as shown at 42 to ensure continuous charging of the battery. However, since it may be hard to precisely balance the components so that the amount of discharge (in amp-hours) from the battery into the load approximates the amount of charge put back into the battery through the admission of the charge pulses, there may be periodic cycles wherein the battery voltage is still maintained high enough after a discharge that the sensed battery voltage will be too high compared to the reference voltage at R7, precluding admission of further charging pulses from SCR 12'. This will produce a longer discharge period as shown at 45, for instance.

It is thus seen that the battery operates primarily as a capacitor in this mode of operation since the high current pulses admitted from the charging circuitry are absorbed almost entirely by the battery, and during the time when there are no pulses supplied the current to the load is supplied solely from the battery.

The power supply mode of operation of this circuitry as just described has been successfully tested in an AC/DC grass trimmer powered by an 8-volt DC motor. The product is usable in the AC mode continuously by plugging the grass trimmer unit cord into a standard 120 volt AC receptacle. If the user wishes to trim grass in a remote location, beyond the reach of the cord provided with the unit, the user simply unplugs the cord (preferably only a pigtail cord remains at the handle of the unit), and the unit may then be used in a straight DC mode running off the battery power for an extended period of time, determined by the battery capacity. When the batteries become discharged it is simply necessary to once again plug in the unit to charge the batteries and, if desired, to thereafter simultaneously power the grass trimmer motor by closing switch 24.

While various batteries may be used in this application, they must be rechargeable in a constant voltage mode and must be able to accept the relatively high amplitude current pulses impressed. A battery which is especially suited for this application is formed of thin plate, spirally wound normally sealed lead-acid cells described in U.S. Pat. No. 3,862,861 to McClelland et al.

In the example shown in FIG. 2, the operational amplifier is a type 741, the SCR a type 2N687, and transistor Q1 is a 2N3904.

It will be understood that a variety of modifications and variations may be employed without departing from the spirit and scope of the invention, as defined by the appended claims. For instance, the circuit may be modified to compensate for transient line voltage variations. Similarly, the operational amplifier is merely one example of a control device for making comparisons between the battery voltage and a reference voltage, and clearly other transistor networks or the like can be substituted. The invention in no way is intended to be limited by the specific components or arrangement of components shown in the preferred embodiment of FIG. 2.

What is claimed is:

1. A transformerless AC to DC battery charger circuit having a pair of output terminals, comprising:
   rectifier circuit means for converting the AC line to direct current;
   semiconductor switching means coupled between the rectifier means and output terminals of the charger circuit for supplying charging pulses;
   resistor means connected to the control terminal of the semiconductor switching means;
   trigger circuit means coupled to a control terminal of the semiconductor switching means and operable to generate a trigger pulse at a phase joint intermediate the ends of a half wave cycle of the rectified line current for enabling conduction of the semiconductor switching means to produce a charging pulse for the remainder of said half wave cycle;
   said trigger circuit means including a relaxation oscillator circuit comprising a resistor/capacitor network and a unijunction transistor whose emitter is connected to the resistor/capacitor network, and whose output is directly connected to the control terminal of the semiconductor switching means through the resistor means;
   battery sensing circuit means coupled between the output terminals and trigger circuit means adapted to monitor battery voltage, compare it to a predetermined reference voltage, and generate a signal responsive to the difference between the battery and reference voltages for controlling operation of the trigger circuit means;
   a semiconductor element shunting the capacitor of the resistor/capacitor network;
   said battery sensing circuit means producing an output signal which controls the conductive state of said semiconductor element which shunts the capacitor of the trigger circuit means, the state of conductivity of the semiconductor element rendering the trigger circuit means either operative whereby phase controlled pulses are impressed to the control terminal of the semiconductor switching means, or inoperative; and
   voltage regulator circuitry for regulating the output voltage from the rectifier circuit and for supplying regulated voltage to the trigger and battery sense circuits.

2. The battery charger circuit of claim 1 wherein said shunting semiconductor element is a transistor and the battery sensing circuit means comprises an operational amplifier whose output signal controls said transistor whose state of conductivity renders the trigger circuit means either operative or non-operative.

3. A transformerless DC power supply energizable from an AC source, supplying uninterrupted DC power to a load irrespective of whether the power supply is being energized by the AC source at a given instant, comprising:
   a rechargeable battery; and
   an AC to DC conversion circuit having output terminals directly and permanently coupled to the battery, for simultaneously charging the battery and supplying, in conjunction with the battery, power to a load adapted to be connected in parallel across the battery;
   said AC to DC circuit comprising:
      rectifier circuit means for converting the AC source to DC of periodic wave form;
      switching means having a control terminal and connected between the rectifier circuit means and the battery, switching alternatively from conductive to nonconductive states;
      trigger circuit means coupled to the control terminal of the switching means for controlling conduction thereof, for generating a trigger pulse at a phase point intermediate the beginning and end of the periodic wave form responsive to the state of charge of the battery;
      battery sensing circuit means coupled between the battery and trigger circuit means for monitoring the state of charge of the battery and for controlling operation of the trigger circuit means in response to the battery state of charge sensed;
      voltage regulator circuitry for regulating voltage applied to the trigger circuit means; and
      the components of said AC to DC circuit being sized relative to the load adapted to be connected thereto so that the current supplied in pulses by the switching means (area under the pulse curve) slightly exceeds the total amount of current supplied back through the load from discharge of the battery between consecutive pulses.

4. The power supply of claim 3 wherein said trigger pulse is generated near the end of the periodic wave form.

5. A transformerless DC power supply system energizable from an AC source, automatically supplying uninterrupted DC power to a load irrespective of whether the power supply is being energized by the AC source at a given instant, or whether the battery alone is discharging through the load, comprising:
- a rechargeable battery;
- a predetermined load connected in parallel across the battery, and mechanically operable switch means to selectively connect or disconnect the load to the power supply; and
- an AC to DC conversion circuit having output terminals directly and permanently coupled to the battery, for simultaneously charging the battery and supplying, in conjunction with the battery, power to the load;
- said AC to DC circuit comprising:
    - rectifier circuit means for converting the AC source to DC of periodic wave form;
    - semiconductor switching means having a control terminal and connected between the rectifier circuit means and the battery, switching alternately from conductive to nonconductive states;
    - trigger circuit means coupled to the control terminal of the switching means for controlling conduction thereof, for generating a trigger pulse at a phase point intermediate the beginning and end of the periodic wave form responsive to the state of charge of the battery;
    - battery sensing circuit means coupled between the battery and trigger circuit means for monitoring the state of charge of the battery and for controlling operation of the trigger circuit means in response to the battery state of charge sensed;
    - voltage regulatory circuitry for regulating voltage applied to the trigger circuit means; and
    - the components of said AC to DC circuit being sized relative to the load so that the current supplied in pulses by the semiconductor switching means (area under the pulse curve) slightly exceeds the total amount of current supplied back through the load from discharge of the battery between consecutive pulses.

6. The DC power supply system of claim 5 wherein the trigger cicuit means supplies a trigger pulse which is of substantial uniform amplitude so long as the battery is less than fully charged, and upon reaching full state of charge of the battery, the battery sensing circuit means produces an output signal which renders a semiconductor control element conductive thereby rendering the trigger circuit means nonoperative, latching off further trigger pulsing until the battery is again reduced below its full state of charge level.

* * * * *